(12) United States Patent
Sinclair et al.

(10) Patent No.: US 7,552,271 B2
(45) Date of Patent: Jun. 23, 2009

(54) NONVOLATILE MEMORY WITH BLOCK MANAGEMENT

(75) Inventors: Alan Welsh Sinclair, Falkirk (GB); Barry Wright, Edinburgh (GB)

(73) Assignee: SanDisk Corporation, Milpitas, CA (US)

( * ) Notice: Subject to any disclaimer, the term of this patent is extended or adjusted under 35 U.S.C. 154(b) by 0 days.

(21) Appl. No.: 11/459,260

(22) Filed: Jul. 21, 2006

(65) Prior Publication Data

US 2007/0033331 A1 Feb. 8, 2007

Related U.S. Application Data

(60) Provisional application No. 60/746,740, filed on May 8, 2006, provisional application No. 60/705,388, filed on Aug. 3, 2005.

(51) Int. Cl.
*G06F 12/00* (2006.01)
(52) U.S. Cl. .................................. 711/103; 711/154
(58) Field of Classification Search ................ 711/103, 711/154; 365/185.33
See application file for complete search history.

(56) References Cited

U.S. PATENT DOCUMENTS

| | | | |
|---|---|---|---|
| 4,800,520 A | 1/1989 | Iijima | |
| 4,802,117 A | 1/1989 | Chrosny et al. | |
| 5,226,155 A | 7/1993 | Iijima | |
| 5,341,339 A | 8/1994 | Wells | |
| 5,369,754 A | 11/1994 | Fandrich et al. | |
| 5,388,083 A | 2/1995 | Assar et al. | |
| 5,404,485 A | 4/1995 | Ban | |
| 5,568,423 A * | 10/1996 | Jou et al. ............... | 365/185.33 |
| 5,570,315 A | 10/1996 | Tanaka et al. | |
| 5,581,723 A | 12/1996 | Hasbun et al. | |
| 5,592,662 A | 1/1997 | Sawada et al. | |
| 5,592,669 A | 1/1997 | Robinson et al. | |
| 5,602,987 A | 2/1997 | Harari et al. | |
| 5,619,690 A | 4/1997 | Matsumani et al. | |
| 5,634,050 A | 5/1997 | Krueger et al. | |
| 5,774,397 A | 6/1998 | Endoh et al. | |
| 5,799,168 A | 8/1998 | Ban | |
| 5,809,558 A | 9/1998 | Matthews et al. | |
| 5,832,493 A | 11/1998 | Marshall et al. | |
| 5,867,641 A * | 2/1999 | Jenett ............................ | 714/7 |
| 5,896,393 A | 4/1999 | Yard et al. | |

(Continued)

FOREIGN PATENT DOCUMENTS

DE 10234971 A1 2/2004

(Continued)

OTHER PUBLICATIONS

Rankl, Wolfgang et al., "Smart Card Handbook, Third Edition (translated by Kenneth Cox)", John Wiley & Sons, Ltd., 2004, pp. 52-93, 233-369, and 435-490.

(Continued)

*Primary Examiner*—Shane M Thomas
(74) *Attorney, Agent, or Firm*—Davis Wright Tremaine LLP

(57) ABSTRACT

In a nonvolatile memory system that includes a block-erasable memory array, records are individually maintained for certain classifications of blocks. One or more lists may be maintained for the blocks, an individual list ordered according to a descriptor value. Such ordered lists allow rapid identification of a block by descriptor value.

4 Claims, 6 Drawing Sheets

Table of Block Classifications

| Block Type | Block Contents | | | Block Classification |
|---|---|---|---|---|
| | Valid Data | Erased Capacity | Obsolete Data | |
| Program | Yes | Yes | Don't Care | Partial Block |
| Common | Yes | Yes | Don't Care | Partial Block |
| Full Common | Yes | No | No | None |
| | | | Yes | Obsolete Block |
| File | Yes | No | No | None |
| | | | Yes | Obsolete Block |
| Invalid | No | Yes | Yes | Obsolete Block |
| Erased | No | Yes | No | Erased Block |

U.S. PATENT DOCUMENTS

| | | | |
|---|---|---|---|
| 5,907,854 A | 5/1999 | Kerns | |
| 5,928,347 A | 7/1999 | Jones | |
| 5,933,845 A | 8/1999 | Kopp et al. | |
| 5,933,846 A | 8/1999 | Endo | |
| 5,937,425 A | 8/1999 | Ban | |
| 5,966,720 A | 10/1999 | Itoh et al. | |
| 5,987,478 A | 11/1999 | See et al. | |
| 6,014,724 A | 1/2000 | Jenett | |
| 6,021,415 A | 2/2000 | Cannon et al. | |
| 6,038,636 A | 3/2000 | Brown, III et al. | |
| 6,046,935 A | 4/2000 | Takeuchi et al. | |
| 6,069,827 A | 5/2000 | Sinclair | |
| 6,145,069 A | 11/2000 | Dye | |
| 6,148,354 A | 11/2000 | Ban et al. | |
| 6,216,204 B1 | 4/2001 | Thiriet | |
| 6,226,728 B1 | 5/2001 | See et al. | |
| 6,256,690 B1 | 7/2001 | Carper | |
| 6,275,804 B1 | 8/2001 | Carl et al. | |
| 6,279,069 B1 | 8/2001 | Robinson et al. | |
| 6,347,355 B1* | 2/2002 | Kondo et al. | 711/103 |
| 6,373,746 B1 | 4/2002 | Takeuchi et al. | |
| 6,374,324 B2 | 4/2002 | Han | |
| 6,385,690 B1 | 5/2002 | Iida et al. | |
| 6,401,160 B1 | 6/2002 | See et al. | |
| 6,412,040 B2 | 6/2002 | Hasbun et al. | |
| 6,426,893 B1 | 7/2002 | Conley et al. | |
| 6,446,140 B1 | 9/2002 | Nozu | |
| 6,456,528 B1 | 9/2002 | Chen | |
| 6,467,015 B1 | 10/2002 | Nolan et al. | |
| 6,467,021 B1 | 10/2002 | Sinclair | |
| 6,477,616 B1 | 11/2002 | Takahashi | |
| 6,480,935 B1 | 11/2002 | Carper et al. | |
| 6,484,937 B1 | 11/2002 | Devaux et al. | |
| 6,490,649 B2 | 12/2002 | Sinclair | |
| 6,493,811 B1 | 12/2002 | Blades et al. | |
| 6,522,580 B2 | 2/2003 | Chen et al. | |
| 6,535,949 B1 | 3/2003 | Parker | |
| 6,542,407 B1 | 4/2003 | Chen et al. | |
| 6,547,150 B1 | 4/2003 | Deo et al. | |
| 6,567,307 B1 | 5/2003 | Estakhri | |
| 6,598,114 B2 | 7/2003 | Funakoshi | |
| 6,604,168 B2 | 8/2003 | Ogawa | |
| 6,668,336 B2 | 12/2003 | Lasser | |
| 6,681,239 B1 | 1/2004 | Munroe et al. | |
| 6,763,424 B2 | 7/2004 | Conley | |
| 6,766,432 B2 | 7/2004 | Saltz | |
| 6,771,536 B2 | 8/2004 | Li et al. | |
| 6,772,955 B2 | 8/2004 | Yoshimoto et al. | |
| 6,779,063 B2 | 8/2004 | Yamamoto | |
| 6,781,877 B2 | 8/2004 | Cernea et al. | |
| 6,823,417 B2 | 11/2004 | Spencer | |
| 6,834,331 B1 | 12/2004 | Liu | |
| 6,886,083 B2 | 4/2005 | Murakami | |
| 6,895,464 B2 | 5/2005 | Chow et al. | |
| 6,898,662 B2 | 5/2005 | Gorobets | |
| 6,925,007 B2 | 8/2005 | Harari et al. | |
| 6,938,116 B2 | 8/2005 | Kim et al. | |
| 7,032,065 B2 | 4/2006 | Gonzalez et al. | |
| 7,092,911 B2 | 8/2006 | Yokota et al. | |
| 2002/0013879 A1* | 1/2002 | Han | 711/103 |
| 2002/0099904 A1 | 7/2002 | Conley | |
| 2002/0194451 A1* | 12/2002 | Mukaida et al. | 711/203 |
| 2003/0088812 A1 | 5/2003 | Lasser | |
| 2003/0109093 A1 | 6/2003 | Harari et al. | |
| 2003/0147278 A1 | 8/2003 | Tanaka et al. | |
| 2003/0229753 A1 | 12/2003 | Hwang | |
| 2003/0229769 A1 | 12/2003 | Montemayor | |
| 2004/0019716 A1 | 1/2004 | Bychkov et al. | |
| 2004/0073727 A1 | 4/2004 | Moran et al. | |
| 2004/0103241 A1 | 5/2004 | Chang et al. | |
| 2004/0157638 A1 | 8/2004 | Moran et al. | |
| 2004/0177212 A1* | 9/2004 | Chang et al. | 711/103 |
| 2004/0248612 A1 | 12/2004 | Lee et al. | |
| 2005/0141312 A1 | 6/2005 | Sinclair et al. | |
| 2005/0141313 A1 | 6/2005 | Gorobets et al. | |
| 2005/0144357 A1 | 6/2005 | Sinclair | |
| 2005/0144358 A1 | 6/2005 | Conley et al. | |
| 2005/0144360 A1 | 6/2005 | Bennett et al. | |
| 2005/0144363 A1* | 6/2005 | Sinclair | 711/103 |
| 2005/0144365 A1 | 6/2005 | Gorobets et al. | |
| 2005/0144367 A1 | 6/2005 | Sinclair | |
| 2005/0144516 A1* | 6/2005 | Gonzalez et al. | 714/8 |
| 2005/0166087 A1 | 7/2005 | Gorobets | |
| 2006/0020744 A1 | 1/2006 | Sinclair et al. | |
| 2006/0020745 A1 | 1/2006 | Conley et al. | |
| 2006/0031593 A1 | 2/2006 | Sinclair | |
| 2006/0101084 A1* | 5/2006 | Kishi et al. | 707/200 |
| 2006/0149916 A1* | 7/2006 | Nase | 711/173 |
| 2006/0155920 A1 | 7/2006 | Smith et al. | |
| 2006/0155921 A1 | 7/2006 | Gorobets et al. | |
| 2006/0155922 A1 | 7/2006 | Gorobets et al. | |
| 2006/0161724 A1 | 7/2006 | Bennett et al. | |
| 2006/0161728 A1 | 7/2006 | Bennett et al. | |
| 2006/0168395 A1 | 7/2006 | Deng et al. | |
| 2006/0184718 A1 | 8/2006 | Sinclair et al. | |
| 2006/0184719 A1 | 8/2006 | Sinclair | |
| 2006/0184720 A1 | 8/2006 | Sinclair et al. | |
| 2006/0184722 A1 | 8/2006 | Sinclair | |
| 2006/0184723 A1 | 8/2006 | Sinclair et al. | |
| 2007/0030734 A1 | 2/2007 | Sinclair et al. | |
| 2007/0033323 A1 | 2/2007 | Gorobets | |
| 2007/0033324 A1 | 2/2007 | Sinclair | |
| 2007/0033326 A1 | 2/2007 | Sinclair | |
| 2007/0033328 A1 | 2/2007 | Sinclair et al. | |
| 2007/0033329 A1 | 2/2007 | Sinclair et al. | |
| 2007/0033330 A1 | 2/2007 | Sinclair et al. | |
| 2007/0033332 A1 | 2/2007 | Sinclair et al. | |
| 2007/0033374 A1 | 2/2007 | Sinclair et al. | |
| 2007/0033375 A1 | 2/2007 | Sinclair et al. | |
| 2007/0033376 A1 | 2/2007 | Sinclair et al. | |
| 2007/0033377 A1 | 2/2007 | Sinclair et al. | |
| 2007/0033378 A1 | 2/2007 | Sinclair et al. | |
| 2007/0086260 A1 | 4/2007 | Sinclair | |
| 2007/0088904 A1 | 4/2007 | Sinclair | |
| 2007/0186032 A1 | 8/2007 | Sinclair et al. | |

FOREIGN PATENT DOCUMENTS

| | | |
|---|---|---|
| EP | 0 852 765 B1 | 9/2001 |
| EP | 1100001 B1 | 8/2003 |
| EP | 1 571 557 A1 | 9/2005 |
| JP | 62-283496 A | 12/1987 |
| JP | 2002-251310 A | 9/2002 |
| JP | 2005-122439 A | 5/2005 |
| WO | WO 00/49488 A1 | 8/2000 |
| WO | WO 02/29575 A2 | 4/2002 |
| WO | WO 2004/012027 A2 | 2/2004 |
| WO | WO 2004/040453 A2 | 5/2004 |
| WO | WO 2004/040455 A2 | 5/2004 |
| WO | WO 2004/046937 A1 | 6/2004 |
| WO | WO 2005/066793 A1 | 7/2005 |

OTHER PUBLICATIONS

Ban, Amir, "Inside Flash File Systems—Part I", IC Card Systems & Design, Jul./Aug. 1993, pp. 15-16.

Ban, Amir, "Inside Flash File Systems—Part II", IC Card Systems & Design, Sep./Oct. 1993, pp. 21-24.

Intel AP-686 Application Note, "Flash File System Selection Guide," Dec. 1998, 18 pages.

Ban, Amir, "Local Flash Disks: Two Architectures Compared," M-Systems Flash Disk Pioneers, White Paper, Rev. 1.0, Aug. 2001, 9 pages.

Kim, Han-Joon et al., "A New Flash Memory Management for Flash Storage System", Computer Software and Applications Conference, 1999. Compsac '99 Proceedings. IEEE Comput. Soc., pp. 284-289.

Notification of Transmittal of the International Search Report and the Written Opinion of the International Searching Authority, or the Declaration, in corresponding PCT/US2006/030228, dated Nov. 23, 2006, 12 pages.

Chiang et al., "Cleaning Policies in Mobile Computers Using Flash Memory," *Journal of Systems & Software*, vol. 48, 1999, pp. 213-231.

Imamiya et al., "A 125-mm2 1-Gb NAND Flash Memory with 10-Mbyte/s Program Speed" Nov. 2002, IEEE Journal of Solid-State Circuits, vol. 37, No. 11, pp. 1493-1501.

Kjelso et al., "Memory Management in Flash-Memory Disks with Data Compression", 1995, Springer-Verlag, pp. 399-413.

Kim et al., "A Space-Efficient Flash Translation Layer for CompactFlash Systems," *IEEE Transactions on Consumer Electronics*, vol. 48, No. 2, May 2002, pp. 366-375.

Lim et al., "An Efficient NAND Flash File System for Flash Memory Storage," *IEEE Transactions on Computer*, vol. 55, No. 7, Jul. 1, 2006, pp. 906-912.

PNY Technologies Attache Flash Product, http://web.archive.org/web/20030704092223/http://www.pny.com/products/flash/attache.asp.07/04/2003. pp. 1-2.

USPTO, "Office Action," mailed in related U.S. Appl. No. 11/459,268 on Jan. 22, 2008, 37 pages.

Chiang, Mei-Ling et al., "Data Management in a Flash Memory Based Storage Server", National Chiao-Tung University, Hsinchu, Taiwan, Dept. of Computer and Information Science. Internet citation [Online] XP002255590, http://citeseer.nj.nec.com/11056.html, Nov. 17, 2006, 8 pages.

Chiang et al., "Managing Flash Memory in Personal Communication Devices," IEEE, 1997, pp. 177-182.

USPTO, "Office Action," mailed in related U.S. Appl. No. 11/382,232 on Jan. 8, 2008, 8 pages.

USPTO, "Office Action," mailed in related U.S. Appl. No. 11/382,235 on Jan. 18, 2008, 24 pages.

Wu et al., "eNVy: A Non-Volatile, Main Memory Storage System" *ACM Sigplan Notices*, vol. 29, No. 11, Nov. 1, 1994, pp. 86-97.

EPO, "Examiner's Report," corresponding European Patent Application No. 06 789 283.6, mailed on Aug. 5, 2008, 3 pages.

USPTO, "Office Action," mailed in related U.S. Appl. No. 11/459,268 on Sep. 8, 2008, 31 pages.

USPTO, "Office Action," mailed in related U.S. Appl. No. 11/382,235 on Sep. 10, 2008, 22 pages.

USPTO, "Notice of Allowance and Fee(s) Due," mailed in related U.S. Appl. No. 11/459,268 on Mar. 3, 2009, 36 pages.

USPTO, "Notice of Allowance and Fee(s) Due," mailed in related U.S. Appl. No. 11/382,235 on Mar. 6, 2009, 31 pages.

USPTO, "Notice of Allowance and Fee(s) Due," mailed in related U.S. Appl. No. 11/382,232 on Jul. 17, 2008, 16 pages.

* cited by examiner

Table of Block Classifications

| Block Type | Block Contents | | | Block Classification |
|---|---|---|---|---|
| | Valid Data | Erased Capacity | Obsolete Data | |
| Program | Yes | Yes | Don't Care | Partial Block |
| Common | Yes | Yes | Don't Care | Partial Block |
| Full Common | Yes | No | No | None |
| | | | Yes | Obsolete Block |
| File | Yes | No | No | None |
| | | | Yes | Obsolete Block |
| Invalid | No | Yes | Yes | Obsolete Block |
| Erased | No | Yes | No | Erased Block |

Block Classifications

| Block Type | Block Contents | | | Block Classification |
|---|---|---|---|---|
| | Valid Data | Erased Capacity | Obsolete Data | |
| Program | Yes | Yes | Don't Care | Partial Block |
| Common | Yes | Yes | Don't Care | Partial Block |
| Full Common | Yes | No | No | Complete Common Block |
| | | | Yes | Obsolete Block |
| File | Yes | No | No | None |
| | | | Yes | Obsolete Block |
| Invalid | No | Yes | Yes | Obsolete Block |
| Erased | No | Yes | No | Erased Block |

*FIG. 4*

Block Record Hierarchy

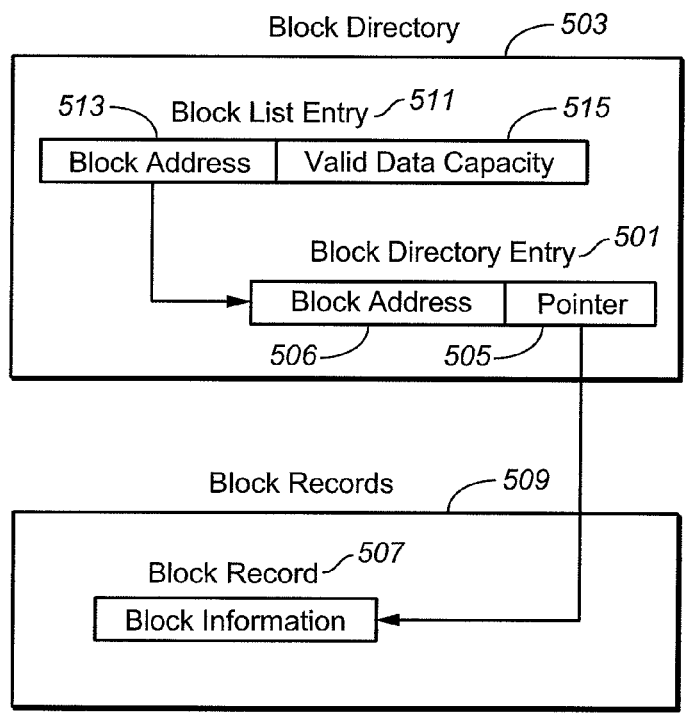

*FIG. 5*

NONVOLATILE MEMORY WITH BLOCK MANAGEMENT

CROSS-REFERENCE TO RELATED APPLICATIONS

The benefit is claimed of United States provisional patent applications of Alan W. Sinclair and Barry Wright, Application No. 60/705,388, filed Aug. 3, 2005 and Application No. 60/746,740, filed May 8, 2006.

This application is also related to U.S. patent application Ser. No. 11/459,255, now publication no. 2007/0033375 A1, entitled "Indexing of File Data in Reprogrammable Non-Volatile Memories That Directly Store Data Files," application Ser. No. 11/459,246 now publication no. 2007/0033374 A1, entitled "Reprogrammable Non-Volatile Memory Systems with Indexing of Directly Stored Data Files," and application Ser. No. 11/459,268, now publication no. 2007/0033332 A1 entitled "Methods of Managing Blocks in Nonvolatile Memory", all naming as inventors Alan W. Sinclair and Barry Wright and all filed concurrently herewith, namely on Jul. 21, 2006.

This application is also related to U.S. patent application Ser. Nos. 11/060,174, 11/060,248 and 11/060,249, all filed on Feb. 16, 2005, naming as inventors either Alan W. Sinclair alone or with Peter J. Smith, now publication nos. 2006/0184718 A1, 2006/0184719 A1 and 2006/0184720 A1.

This application is also related to U.S. patent application Ser. Nos. 11/060,174, 11/060,248 and 11/060,249, all filed on Feb. 16, 2005, naming as inventors either Alan W. Sinclair alone or with Peter J. Smith.

This application is also related to the following four United States utility patent applications of Alan W. Sinclair and Barry Wright: application Ser. No. 11/382,224, entitled "Management of Memory Blocks That Directly Store Data Files;" now publication no. 2007/0033328 A1, application Ser. No. 11/382,228, entitled "Memory System With Management of Memory Blocks That Directly Store Data Files;" now publication no. 2007/0033329 A1, application Ser. No. 11/382,232, entitled "Reclaiming Data Storage Capacity in Flash Memories;" now publication no. 2007/0030734 A1, application Ser. No. 11/382,235, entitled "Reclaiming Data Storage Capacity in Flash Memory Systems," now publication no. 2007/0033330 A1 and a provisional application by them, Application No. 60/746,742, entitled "File Data Indexing in Flash Memory," all filed on May 8, 2006.

Any and all patents, patent applications, articles, and other publications and documents referenced herein are hereby incorporated herein by those references in their entirety for all purposes. To the extent of any inconsistency or conflict in the definition or use of terms between the present application and any incorporated patents, patent applications, articles or other publications and documents, those of the present application shall prevail.

BACKGROUND AND SUMMARY

This application relates to the operation of re-programmable non-volatile memory systems such as semiconductor flash memory, and, more specifically, to the management of individually erasable blocks of a memory array.

There are two primary techniques by which data communicated through external interfaces of host systems, memory systems and other electronic systems are addressed. In one of them, addresses of data files generated or received by the system are mapped into distinct ranges of a continuous logical address space established for the system in terms of logical blocks of data (hereinafter the "LBA interface"). The extent of the address space is typically sufficient to cover the full range of addresses that the system is capable of handling. In one example, magnetic disk storage drives communicate with computers or other host systems through such a logical address space. This address space has an extent sufficient to address the entire data storage capacity of the disk drive.

Flash memory systems are most commonly provided in the form of a memory card or flash drive that is removably connected with a variety of hosts such as a personal computer, a camera or the like, but may also be embedded within such host systems. When writing data to the memory, the host typically assigns unique logical addresses to sectors, clusters or other units of data within a continuous virtual address space of the memory system. Like a disk operating system (DOS), the host writes data to, and reads data from, addresses within the logical address space of the memory system. A controller within the memory system translates logical addresses received from the host into physical addresses within the memory array, where the data are actually stored, and then keeps track of these address translations. The data storage capacity of the memory system is at least as large as the amount of data that is addressable over the entire logical address space defined for the memory system.

In current commercial flash memory systems, the size of the erase unit has been increased to a block of enough memory cells to store multiple sectors of data. Indeed, many pages of data are stored in one block, and a page may store multiple sectors of data. Further, two or more blocks are often operated together as metablocks, and the pages of such blocks logically linked together as metapages. A page or metapage of data are written and read together, which can include many sectors of data, thus increasing the parallelism of the operation. Along with such large capacity operating units come challenges in operating them efficiently.

For ease of explanation, unless otherwise specified, it is intended that the term "block" as used herein refer to either the block unit of erase or a multiple block "metablock," depending upon whether metablocks are being used in a specific system. Similarly, reference to a "page" herein may refer to a unit of programming within a single block or a "metapage" within a metablock, depending upon the system configuration.

When the currently prevalent LBA interface to the memory system is used, files generated by a host to which the memory is connected are assigned unique addresses within the logical address space of the interface. The memory system then commonly maps data between the logical address space and pages of the physical blocks of memory. The memory system keeps track of how the logical address space is mapped into the physical memory but the host is unaware of this. The host keeps track of the addresses of its data files within the logical address space but the memory system operates with little or no knowledge of this mapping.

In the second of the two system interface techniques that are used, data files generated or received by an electronic system are uniquely identified and their data logically addressed by offsets within the file. A form of this addressing method is used between computers or other host systems and a removable memory card known as a "Smart Card." Smart Cards are typically used by consumers for identification, banking, point-of-sale purchases, ATM access and the like, and contain a small amount of memory when compared to flash memory cards and flash drives.

In the patent applications cross-referenced above, a data file is identified in the mass storage flash memory system by a filename assigned by the host and data of the file are accessed by offset addresses within the file (hereinafter "direct data file interface"). The memory system then knows the host file to which each sector or other unit of data belongs. The file unit being discussed herein is a set of data that is ordered, such as by having sequential logical offset addresses, and which is created and uniquely identified by an application program operating in a host computing system to which the memory system is connected.

The four utility patent applications referenced above (application Ser. Nos. 11/382,224; 11/382,228; 11/382,232; 11/382,235), filed on May 8, 2006), describe techniques in which lists of blocks are maintained for access during operation of the memory system. Individual entries on the lists include parameters of memory blocks and their addresses. An entry within a list may be selected according to either the physical address of the block to which it relates, or the value of a block parameter that is recorded within the entry. The present description relates to storing one or more lists of data blocks within a designated block in flash memory, and accessing a specific entry in a list on the basis of the information content of a field within the entry.

The technique uses some of the logical pages in the designated block for storage of unordered records containing information of all blocks on two or more lists. Other pages are used for lists of entries containing only a content-addressable parameter for the blocks, and a pointer to the full record for the block. Entries in these lists are stored in order of the parameter values, and an entry with a specific parameter value can quickly be accessed. The lists act as a form of directory to the unordered records for the blocks.

In a block-erasable nonvolatile memory, maintaining up-to-date information on individual blocks and the data they contain allows efficient memory management. Where blocks contain a mixture of valid data of one or more files, obsolete data, and erased space this may be quite complex. However, by keeping track of such data on a block-by-block basis, certain memory system operations, particularly reclaiming of unused space in the memory array, may be efficiently performed. Reclaim of unused space (space containing obsolete data or unusable erased space) takes place on a block-by-block basis (where a block is the unit of erase). It is desirable to perform block reclaim operations on blocks in an efficient order, to reduce copying of valid data. To determine the order of block reclaim, it is useful to have blocks ranked in order of one or more descriptor values, where a descriptor value is descriptive of at least one aspect of the data stored in a block. For example, blocks may be ordered by the amount of valid data they contain so that those blocks containing the least amount of valid data may be quickly identified to be reclaimed first.

In a first example, records are maintained for a variety of blocks in the memory array, though not necessarily all blocks. Blocks containing valid data are classified according to whether they contain erased space (partial blocks) and if not, whether they contain obsolete data (obsolete blocks). Blocks with only obsolete data (invalid blocks) and blocks containing only erased space (erased blocks) are separately classified. A record is maintained for each block having one of these classifications. Records are maintained in dedicated record blocks. In addition, blocks in a classification are listed in lists that are ordered by a descriptor value. The descriptor value may be the amount of valid data in the block, the address of the block or some other descriptor value. List entries, in the first example, contain pointers to corresponding records.

In a second example, records are also maintained for blocks in various classifications. The classification "complete common block" is added for a block that contains data of more than one file and that does not contain obsolete data or erased space. Records are maintained in dedicated record pages in dedicated record blocks. A record may contain a variety of information regarding the corresponding block including its block address, the amount of valid data it contains, position of write pointer etc.

A directory is provided to allow an individual record to be rapidly found. An entry in the directory identifies a record page and the location of the corresponding record in that record page. The directory is maintained in dedicated directory pages in a directory block, with directory entries ordered by block address. Directory pages contain non-overlapping block address ranges. One directory page may contain pointers to more than one record page. However, a record page contains only records pointed to by entries of one directory page. Thus, when records in a record page are updated, only one directory page needs to be updated.

Directory blocks may also contain one or more lists. An entry in a list contains a block address and a descriptor value and entries in a list are ordered by descriptor value. An exemplary descriptor value is the amount of valid data in a block. Lists provide a convenient way to select a block for reclaim or other purposes based on data in the block. For example, the obsolete block with the least amount of valid data is the first entry in a list of obsolete blocks that uses the amount of valid data as descriptor value. This block can be rapidly identified from the list for reclaim so that the list provides a queue for reclaim operations. In other examples, a block with a particular descriptor value may be sought. This may be identified rapidly by performing a binary search on the appropriate list page.

In a third example, a record is maintained for each block in the nonvolatile memory array at all times. In this case, a directory page contains entries for a fixed block address range with entries sequentially ordered by block address. Because this provides an entry for a particular block at a predetermined offset within a directory page, entries do not have to contain the block address of the block to which they refer.

Although the techniques of managing and accessing lists are described herein for use with flash memory operating with a flash data file interface, these techniques may also be used with other types of lists in different applications.

BRIEF DESCRIPTION OF THE DRAWINGS

FIG. 4 shows a table of block classifications according to a second example.

FIG. 5 shows a block directory entry in a block directory block pointing to a corresponding block record in a block records block.

DESCRIPTION OF ILLUSTRATED EMBODIMENTS

Detailed First Example

Direct data file storage techniques described in the patent applications identified above create lists of blocks from which entries with predefined values related to the use of the individual blocks are selected. A technique for a content addressable search of these block lists is used herein. This description refers to accompanying FIGS. 1-3.

Figures 1, 3:
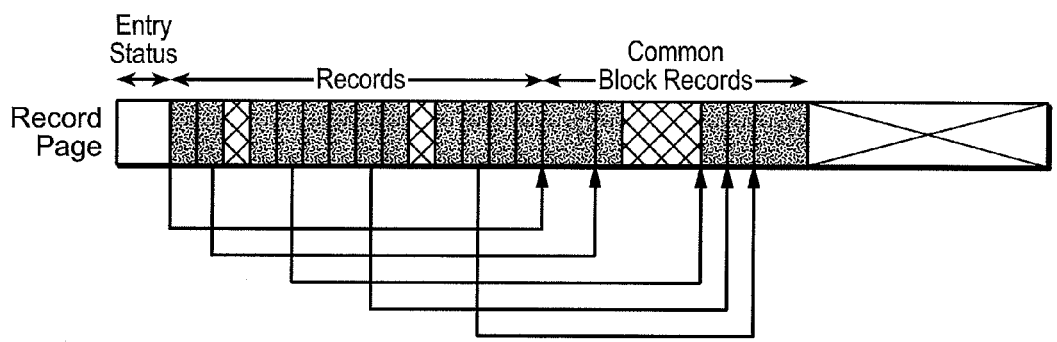
FIG. 1 shows a table of block classifications according to a first example.
FIG. 3 shows a detailed view of an individual page of the record block of FIG. 2.

FIG. 1 is a table that shows a classification of memory cell blocks on the basis their contents. Practically all blocks in the memory system will be classified as shown. Three separate lists are maintained in this example: one of partial blocks, another for obsolete blocks and a third for erased blocks.

The types of blocks recognized in this example are as follows:

- A "program block" has been partially programmed, and contains valid data of only a single file. Some erased capacity remains in the block. It may also contain some obsolete data.
- A "common block" has been partially programmed, and contains valid data of two or more files. Some erased capacity remains. It may also contain some obsolete data.
- A "full common block" has been fully programmed and contains valid data of two or more files. It may also contain some obsolete data.
- A "file block" has been fully programmed, and contains valid data of a single file. It may also contain some obsolete data.
- An "invalid block" contains no valid data. The invalid block contains at least some obsolete data and may contain erased capacity but does not contain any valid data.
- An "erased block", in which the total capacity of the block is unprogrammed and available to accept data. There are no data in an erased block. When the memory is full or nearly full of data, a pool of a specified minimum number of erased blocks is typically maintained by continuously reclaiming unused capacity that exists within blocks that are being used.

For purposes of the present example, blocks having the above types are classified into three classifications as follows:

- A "partial block" contains some unprogrammed capacity, valid data of one or more files and may contain some obsolete data. The program block and common block are examples of partial blocks.
- An "obsolete block" is a file block or a full common block that contains some obsolete data. The obsolete block does not contain any erased capacity, and contains both valid and obsolete data.
- An "erased block" has the same definition as the block type of the same name, a block with no data.

It will be noted that these classifications do not cover all blocks in the memory array, some blocks may remain outside these classifications and such blocks do not appear in the lists of the present example.

When choosing a block for reclaiming storage capacity, the amount of valid data in the blocks (valid data capacity) is a primary factor. Since a reclaim operation on a block requires copying its valid data to another block, those blocks with the least amount of valid data are chosen first. This is because data copying is time consuming and can interfere with the efficient operation of the memory system to program and read data. Countering this somewhat is a benefit of blocks that retain a significant proportion of their capacity erased and available to store data. Therefore, blocks with more useable erased storage capacity are not favored for a reclaim operation since the increase in storage space that would result by reclaiming them is less. The partial and obsolete block lists of this specific example are used to classify blocks on the basis of the amount (number of pages) of valid data they contain and the amount (number of pages) that remain erased. A purpose described herein for these lists is to select one block at a time to be subject to a reclaim operation.

Types and Access of Block Lists

The partial block list (P-list) contains an entry for every partial block in the system; that is, every block containing both some valid data and some erased capacity. It may also contain some obsolete data.

The obsolete block list (O-list) contains an entry for every block in the system containing obsolete data, which does not have an entry in the partial block list.

The erased block list (E-list) contains an entry for every erased block in the system.

In a specific example of flash memory operation, the following block lists are maintained:
- P(V)-list A partial block list with entries ordered according to the valid data capacity stored in the blocks;
- P(A)-list A partial block list with entries ordered according to the block address of the blocks;
- O(V)-list An obsolete block list with entries ordered according to the valid data capacity stored in the blocks;
- O(A)-list Obsolete block list with entries ordered according to the block address of the blocks; and
- E-list An erased block list.

The P(V)-list, O(V)-list, P(A)-list and O(A)-list act as "directories" to a common set of block records. To select a reclaim block, the entries with the lowest valid data capacity values are read from the P(V)-list and O(V)-list. To select an active block, the entry with the highest valid data capacity value less than or equal to a target value is read from the P(V)-list. To select an erased block, the first entry on the E-list is read and removed from the list.

To update an entry in the P-list or O-list, the entry with the target block address is read from the P(A)-list or O(A)-list.

Storage Technique for Block Lists

One or more blocks or metablocks are allocated for the storage of information relating to blocks on the block lists identified in the immediately preceding section. These are known as record blocks, and are written or updated in units of one page. Content addressing is used for information in record blocks.

Each record block contains a fixed number of logical pages, each of which may be updated by re-writing it to the next available physical page. Multiple logical pages are allocated to store records containing information for blocks in the lists. These are known as record pages.

A record exists for every block in the block lists. Record pages and the records within them may be in any order. Records for blocks in different block lists need not be kept separate. Obsolete records may exist within record pages, and may be replaced by new records for blocks that have been added to the block lists. A record contains the physical address of a block and a value defining the amount of valid data within the block (valid data capacity), together with other information.

One or more logical pages are allocated to store entries identifying blocks within one of the individual block lists.

These are known as list pages. Separate list pages are used for different block lists. Each entry in a list page contains a descriptor value, which is the value of either the physical address of the block to which it relates or the valid data capacity within the block (or some other value associated with data in the block), together with a pointer to the record for the block in a record page. Two list entries, each in a different list page for a different block list, may point to the same record if the block to which the record relates appears in two block lists.

Entries in the block lists act as "directory entries" to a common set of records for blocks.

Entries in a list page for the partial block list or obsolete block list are stored in the order of their descriptors. Entries are written in closely packed format, with unwritten entry locations in the list page normally present after the last entry written. List pages store non-overlapping ranges of descriptors. If a list page becomes full, its entries may be divided into two list pages by allocating a new logical page as a list page. Similarly, if the number of entries in two list pages with adjacent descriptor ranges falls below a threshold, the two list pages may be combined into one. An index for the record block contains the descriptors for the first entry of each list page.

An entry in the partial block list or obsolete block list with a target value for block address or valid data capacity may be found by identifying the list page with the appropriate descriptor range from the record block index, reading the page from flash, then performing a linear or binary search within the page for the target entry. The record for the target block may then be read from the record page identified by this entry.

Entries for blocks in the erased block list may be stored in a list page in which they retain the order in which they were written. Erased blocks are always selected as the oldest entry in the list.

Structure of a Record Block

All entries and indexing information for blocks referenced in the block lists are contained in one or more record blocks in flash memory. A record block is a metablock and is updated in units of a page.

A record block has the following characteristics:
1. All types of block lists may be stored together in a single record block.
2. Multiple record blocks may be used, if required.
3. A record block has a specified number of logical pages, which is defined as 25% of the number of physical pages in the block in the present example.
4. A record block index section in the most recently written page provides a mapping for each logical page to a physical page.
5. A logical page may be updated by re-writing it to the next available physical page.
6. A logical page can be allocated to any of the page types used for block lists or for records for blocks.
7. A record block is compacted and re-written in an erased block when full.

Figure 2:
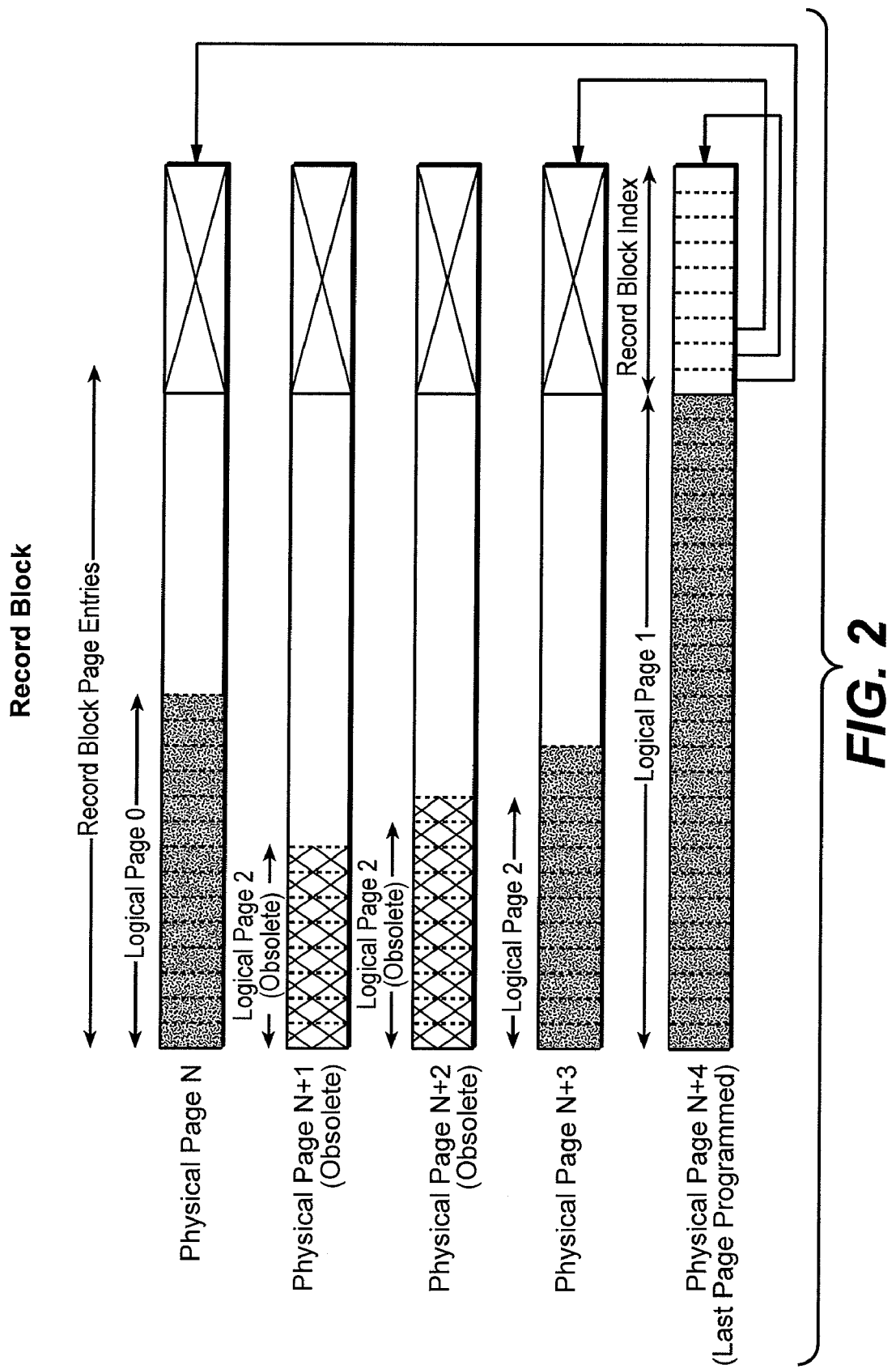
FIG. 2 shows pages of a record block according to the first example.

The structure of an example record block is shown in FIG. 2.

Record Block Index

The record block index exists as a section of each page in the record block. It is valid only in the most recently written page. The record block index contains an entry for each possible logical page, ordered according to logical page number. Each entry has 3 fields, as follows:
1. A numeric code identifying the page type:
   a. P(V)-list page;
   b. P(A)-list page;
   c. O(V)-list page;
   d. O(A)-list page;
   e. E-list page;
   f. Record page; and
   g. Unallocated logical page.
2. Value in the first entry in the page. This allows the range of values in each of the P(V), P(A), O(V), and O(A) list page types to be established and cached.
3. Pointer to the physical page to which the logical page is mapped.

Record Page

A record contains all required information relating to a block with an entry one of the lists, and is stored in a record page. A record page is subdivided into three sections, as follows:
1. Entry status;
2. Records; and
3. Common block records.

The entry status section comprises a bitmap, indicating whether each record is in use, or is available for allocation to a new block. The records section has entries of a fixed size for every block in the lists, with fields defining its attributes as follows:
1. Block address;
2. The capacity of valid data in the block;
3. The position of the page write pointer in the block;
4. The fileId for the first data group in the block;
5. Total number of files for which data exist in the block; and
6. Offset to any common block record that exists for the block. A value of 0 denotes that no common block record exists.

The common block records section has entries with variable sizes, with fields defining other fileIDs in a common block, as follows:
1. FileIDs for each subsequent data group in a common block; and
2. End of records indicator.

The record page may contain obsolete entries resulting from blocks being removed from the block lists. Such record may be re-allocated to new blocks that are added to the lists.

The logical page number within a record block and record number within that page that are allocated to a block are normally not be changed, as they are used by list pages to reference the record. However, it is permissible to move the record for a block to another record number within the same list page, to another list page, or to another record block. If the record for a block is moved, the pointers to it in any list entries must be updated accordingly.

When a record page is modified and re-written, the common block records may be compacted to eliminate any obsolete space and the records updated to reflect any changes in offset to common block records.

The boundary between records and common block records is dynamic.

The structure of an example block records page is shown in FIG. 3.

List Page

A list page contains a set of entries for blocks, in an order defined by descriptor values. Valid data capacity is the descriptor in entries in the P(V)-list and O(V)-list, and block address is the descriptor in entries in the P(A)-list and O(A)-list.

Valid entries occupy a contiguous set of entry locations in a list page, but need not fill the complete page. There are no obsolete entries within the set, and the descriptor values need not be contiguous.

The entries in a list page are in order of the values in their descriptor field. The range of the descriptor values does not overlap the range of descriptor values in any other list page.

When an entry for a block that has been added to a block list needs to be inserted, the list page with a descriptor range that encompasses the descriptor value for the new block is identified. A new entry is inserted at the appropriate location in the descriptor range, and the list page is re-written. When an entry must be removed, the list page is compacted without the entry and is re-written.

When an addition must be made to a list page that has become full, a free logical page is allocated as a new list page and the descriptor range of the full list page is divided into two approximately equal non-overlapping ranges, which are written in the two available list pages.

When the aggregate number of valid entries in two list pages with adjacent descriptor ranges drops below a threshold value (70% of the number of entry locations in a list page in this example), the ranges of the two list pages are consolidated and written in one of the two list pages. The other unused page then becomes a free logical page.

The fields in an entry in a list page for the P(V)-list and O(V)-list are as follows:
1. Valid data capacity in the block; and
2. Pointer to record for block in a record page. The record page need not be in the same record block as the list page.

The fields in an entry in a list page for the P(A)-list and O(A)-list are as follows.
1. Block address; and
2. Pointer to record for block in a record page. The record page need not be in the same record block as the list page.

The field in an entry in a list page for the E-list is as follows:
1. Block address.

Access Sequence for Records

The following sequence of steps is used to access a record for a target block in either the P-list or O-list.
1. Define P(V)-list, O(V)-list, P(A)-list or O(A)-list as the target list.
2. Read record block index from most recently written page in the record block. This information may already exist in a cache.
3. Determine logical page number allocated to the list page for the target descriptor value in the target list defined in step 1.
4. Read logical page number determined in step 3 from the record block.
5. Search list page read in step 4 to read entry for target block.
6. Read record page from the record block as defined by the entry read in step 5.
7. Read record for target block from the record page read in step 6.

Detailed Second Example

In a second example, as in the first example described above, certain blocks are individually classified according to the data they contain and records are maintained for these blocks. Lists are maintained that are ordered according to a descriptor value related to data stored in a block. The amount of valid data in a block is an example of such a descriptor value. However, some of the structures and methods used to manage blocks are different in this second example. The structures and methods of the first and second examples should be viewed as alternatives, with various combinations of structures and/or techniques from both examples also being considered as part of the present disclosure. The second example is described with a focus on differences from the first example. Thus, elements that are common to both examples may not be described in detail again with respect to the second example.

Block classifications in the second example are the same as those of the first example, with the addition of a "Complete common block" classification. FIG. 4 shows a block classification table that is similar to that of FIG. 1, except for the additional classification "Complete common block." Record entries are maintained for each block having a block classification "Partial block"; "Obsolete block"; "Erased block" or "Complete common block." The classification, "Complete common block" is used for common blocks that do not contain any erased capacity and that do not contain any obsolete data. Complete common block (CCB) records are maintained with a block record for every complete common block. Complete common blocks are not generally subjected to reclaim operations because they do not contain space that is available for reclaim (neither erased space nor obsolete space). However, when some data in a complete common block becomes obsolete, the block is reclassified as an obsolete block and may be subject to reclaim operations. When such reclassification occurs, a block record that contains information regarding data stored in the block is needed. This information is available from the block's preexisting CCB record entry. Thus, by maintaining records on complete common blocks, the transition from complete common block to obsolete block may occur without a heavy burden of searching for information to generate a record for the block.

The classification schemes of FIGS. 1 and 4 are exemplary and other schemes are also contemplated. In one example (discussed in detail later), a record may be maintained for all blocks in a memory array at all times. Thus, an additional block classification may be added to the table of FIG. 4 for file blocks having no obsolete data. In other examples, some of the classifications of FIG. 4 may not be needed. For example, no records may be maintained for erased blocks or invalid blocks. In yet other examples, blocks may be divided into different block types than those of FIG. 4. It will be understood that the block types of FIG. 4 are convenient for particular memory management schemes, but other memory management schemes may use different block types.

A record is maintained for every block in one of the block classifications listed in the table of FIG. 4. Records for blocks having different block classifications may be stored together in the same page. In the present example, dedicated block record blocks are maintained that store only block records. In order to facilitate access to individual record entries in the record blocks, a block directory is maintained. The block directory and the block records are stored in separate sets of blocks in flash memory (unlike the first example where a single block could contain both block directory and block records pages). FIG. 5 shows a block directory entry 501 in a directory block 503 that includes a pointer 505 to the location of a corresponding block record 507 in a block record block 509. Block directory entry 501 also contains block address 506.

The block directory contains one block directory entry for each block for which an entry exists in the block records. Block directory entries are stored in non-overlapping ranges of block address values, with each range allocated to a separate block directory page. Entries within a range are ordered according to block address value. The block directory entry for a target block address can be found by reading a single block directory page and performing a binary search within the page. Thus, a block directory provides a convenient way to locate a particular block record entry according to block address.

In some applications, it is desirable to search for a block by criteria other than block address. In some cases, descriptor values associated with the data stored in blocks may be used for such a search. For example, for reclaim purposes, it may be desirable to identify the partial block with the least amount of valid data. One way to find such a block would be to search the record entries for all blocks to determine which block contained the least amount of valid data. However, such searching may add a significant burden. An alternative is to maintain lists of blocks that are ordered according to the amount of valid data they contain (valid data capacity). Thus, where blocks are listed in order of the amount of valid data they contain, identifying the block with the least amount of valid data is simply a matter of reading the first (or last) entry in the list. Similarly, if a block with a particular amount of valid data is required, a binary search may rapidly identify such a block. The amount of valid data stored in a block is given by a descriptor value in a list entry. Such a descriptor value describes data stored in the block. This is in contrast to block address (used as a descriptor value in the first example), which describes the physical location of the block.

A mechanism incorporating a two-stage search process is provided to access a block record according to a descriptor value defined within a field in the record for the amount of valid data in the block. Entries containing the valid data capacity values for the classifications of blocks for which this content addressing mechanism may be used are stored in separate list pages in the block directory. These block list entries are stored in non-overlapping ranges of valid data capacity values, with each range allocated to a separate block list page. Entries within a range are ordered according to their valid data capacity values. Each block list entry contains a block address, which explicitly identifies a block directory entry. Block list entry 511 contains block address 513, which is identical to block address 506 and thereby identifies block directory entry 501. Block list entry 511 also contains valid data capacity 515 for the block having block address 513. A block directory entry for a target valid data capacity value can be found by reading a single list page and performing a binary search within the page to find an entry with the target valid data capacity value, then reading a single directory page and performing a binary search within the directory page to find the entry with the target block address.

A binary search may simply mean looking at an entry in the middle of the page's descriptor value range. Based on a comparison of the descriptor value of this entry with the descriptor value being sought, the search is limited to half the page. An entry at the midpoint of this half page is then similarly examined and the search limited to a quarter of the page. After successive steps, one or more entries are found that have the descriptor value that is sought. In other examples, more sophisticated binary search algorithms may be used. In some examples, no binary search is needed because the descriptor value that is sought is the lowest (or highest) in the list. Thus, the first (or last) entry in the list is selected.

Block records are directly addressed by entries in the block directory. A page of block records is updated by a read/modify/write operation that moves the page to an un-programmed location in the same or another block records block. Block records in a page must all relate to entries in the same block directory page. However, one directory page may contain entries for more than one block records page. Thus, block records page may be updated with consequent need for modification of only a single block directory page.

Block Directory

The block directory is an ordered collection of entries identifying blocks by block address and indicating the locations of corresponding block records. An entry exists in the block directory for each block for which a block record is maintained. In the present example, an entry exists for each partial block, obsolete block, complete common block, and erased block. The block directory is contained in one or more directory blocks.

Figure 6:
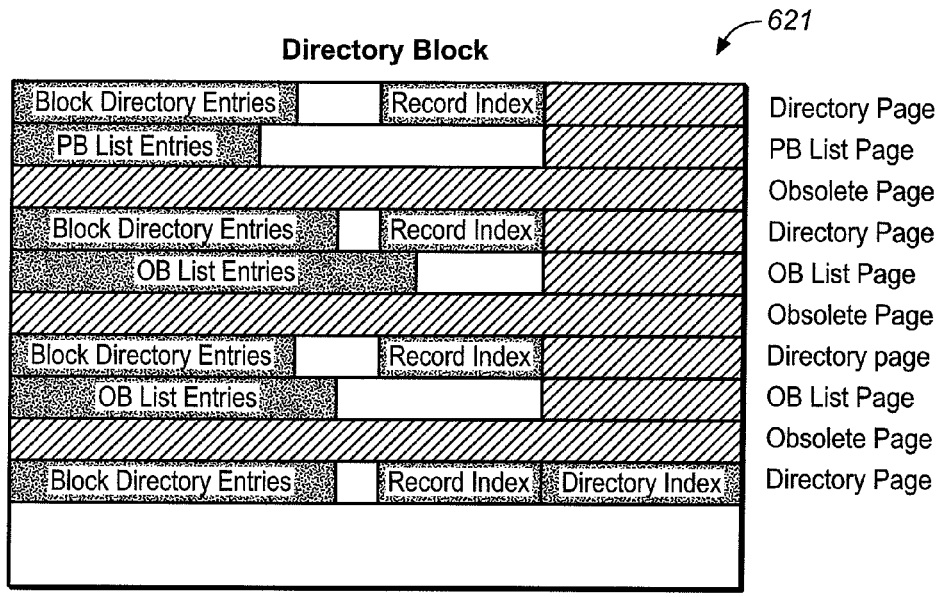
FIG. 6 shows some detail of the page structure of a directory block

FIG. 6 shows a directory block 621 containing obsolete block and partial block list pages. FIG. 6 also shows directory pages in the directory block. Each directory block contains a fixed number of logical pages, each of which may be updated by re-writing it to the next available physical page. A page containing valid entries is allocated a logical page number. The number of logical pages in a directory block is specified as being 25% of the number of physical pages in a block in the present example. In other examples, other limits may be specified. After the last page of a directory block has been written, the block is compacted by writing all valid pages to an erased block and erasing the original directory block.

Block Directory Page

Figure 7A:
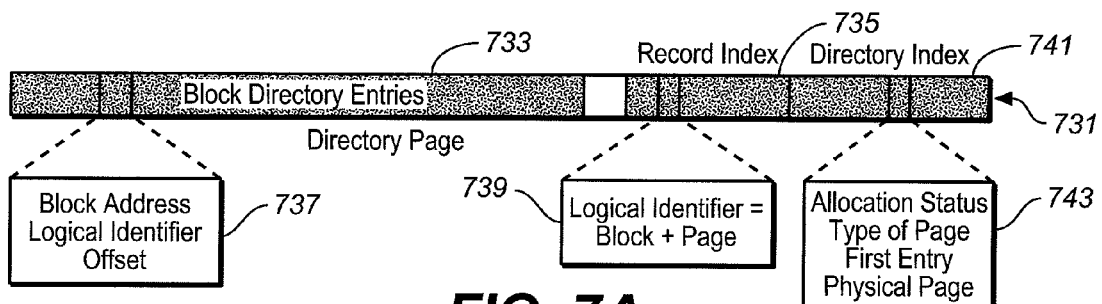
FIG. 7A shows the structure of a block directory page of FIG. 6, including a record index and a directory index.

A block directory page contains a set of block directory entries, in order of their block address values. An example of a block directory page 731 is shown in FIG. 7A. Valid block directory entries 733 occupy a contiguous set of entry locations in block directory page 731, but need not fill the complete page so that erased space may remain. Each block directory page contains a record index (described below). Here, block directory page 731 contains record index 735. There are no obsolete entries within block directory entries 733, and the block address values need not be contiguous. The range of the block address values in a block directory page does not overlap the range of block address values in any other block directory page.

When an entry for a block needs to be inserted, the block directory page with a block address range that encompasses the block address value for the new block is identified from the information in the directory index. A new entry is inserted at the appropriate location in the block address range, and the block directory page is re-written. When an entry must be removed, the block directory page is compacted without the entry and is re-written.

When an addition must be made to a block directory page that has become full, a free logical page is allocated as a new block directory page and the block address range of the block directory page that has become full is divided into two approximately equal non-overlapping ranges, which are written in the two available block directory pages.

When the aggregate number of valid entries in two block directory pages with adjacent block address ranges drops below a threshold value (70% of the number of entry locations in one block directory page in this example), the ranges of the two block directory pages are consolidated and written in one of the two block directory pages. The other unused page then becomes a free logical page.

A block directory entry 737 in this example contains two fields: (1) A block address; (2) A pointer to a corresponding block record. The pointer identifies a logical identifier for a block record page and a byte offset of a particular block record within a page. The block record page logical identifier identifies one of up to 16 separate block record pages that may be referenced by entries in the same block directory page. It is converted to a physical block address and page number by the record index field within the block directory page containing the entry. The byte offset identifies the location of the block record within the identified block record page.

A separate valid record index field exists in each valid block directory page and block list page. It is used to convert logical identifiers for block record pages to physical block addresses and page numbers at which the block record pages are located. Record index 735 contains one entry (such as entry 739) for each logical identifier that is used within any entry in block directory page 731. A maximum of 16 separate block record pages may be referenced by block directory entries in a single block directory page. A 4-bit logical identifier is therefore used. In this way, individual block directory entries may use the 4-bit identifier instead of a longer physical page location for the corresponding block records page. The record index field serves to translate these logical identifiers for all entries in the block directory page.

Figure 7B:
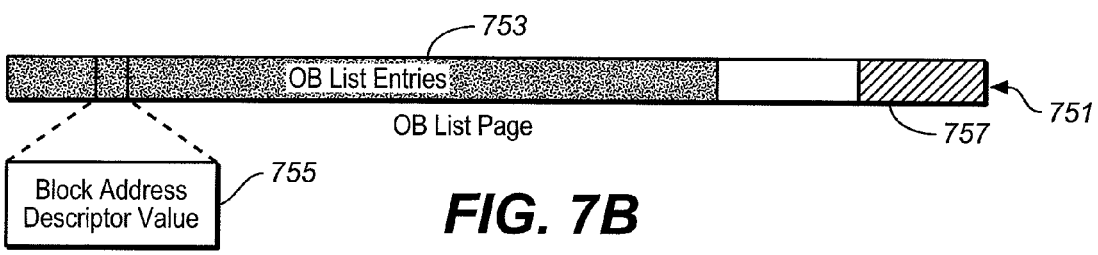
FIG. 7B shows the structure of an obsolete block list page of FIG. 6.

A valid directory index field 741 exists only in the most recently written block directory or block list page. Information in the directory index field in all previously written pages is obsolete. Its purpose is to support the ordering of block directory entries and block list entries and the mapping of logical pages to physical pages. It provides a structure where current data is stored regarding individual pages in the block directory block. The directory index contains an entry, such as entry 743, for each possible logical page, ordered according to logical page number. Each entry has four fields:

(1) Allocation status flag for the logical page
(2) Type of page, e.g. block directory, PB list, or OB list.
(3) Block address of first entry in a block directory page or valid data capacity value of the first entry in a list page (either PB or OB). This allows the range of block address or valid data values in each logical page to be established and cached.
(4) Pointer to the physical page within the block directory to which the logical page is mapped Block List Page A block list page contains a set of block list entries for a single classification of block, in order of a descriptor value describing the data they contain (e.g. the amount of valid data they contain). An example of a block list page 751 is shown in FIG. 7B. In the present example, a block list page may be a PB list page or OB list page. FIG. 7B shows OB list page 751. Valid block list entries 753 may occupy a contiguous set of entry locations in block list page 751, but need not fill the entire page. There are generally no obsolete entries in a block list page. Block list entries 753 are ordered by a descriptor value but descriptor values need not be contiguous and may be repeated. In the present example, the valid data capacity values need not be contiguous and may be repeated. The range of descriptor values of a block list page does not overlap the range of descriptor values of any other block list page for the same block classification.

While valid data capacity is the descriptor value used in the present example, other descriptor values may also be used. For example, the amount of erased capacity in a block may be used as a descriptor value. A descriptor value may be derived from a combination of the amount of valid data and the amount of erased capacity so that blocks are listed in a desired order for reclaim. In some cases, lists may overlap. Thus, the same block may appear in two different lists. For example, blocks may be listed both by the amount of valid data that they contain and (in a separate list) by the amount of erased space they contain.

When an entry for a block needs to be inserted, the block list page with a valid data capacity range that encompasses the valid data capacity value for the new block is identified from the information in the directory index. The block list page is rewritten with the new entry inserted at the appropriate location in the page according to its valid data capacity value. When an entry must be removed, the block list page is rewritten in a new physical location, without the entry.

When an addition must be made to a block list page that has become full, a free logical page is allocated as a new block list page and the valid data range of the block list page that has become full is divided into two approximately equal non-overlapping ranges, which are written in the two available block list pages.

When the aggregate number of valid entries in two block list pages with adjacent ranges drops below a predetermined threshold amount (for example, 70% of the number of entry locations in one block list page), the ranges of the two block list pages are consolidated and written in one of the two block list pages. The other unused page then becomes a free logical page.

A block list entry 755 contains two fields: (1) A block address; (2) A descriptor value, in this example a value indicating the amount of valid data in the block. Unlike the first example, there is no list ordered by block address (although the directory is ordered by block address). In the present example, a list includes a block address from which a directory entry is found, which in turn indicates the location of a corresponding record. Thus, list entry 753 does not directly indicate a record in this example. A block list may contain a directory index, but only the most recently written page contains a valid directory index. The OB list page of FIG. 7B contains an obsolete directory index 757.

Block Records

Block records is a collection of records, each of which contains information for a block identified by a block address. One record exists for each block directory entry. Block records are addressed by block directory entries, and a block directory page must be modified when a block record page is modified.

Figure 8:
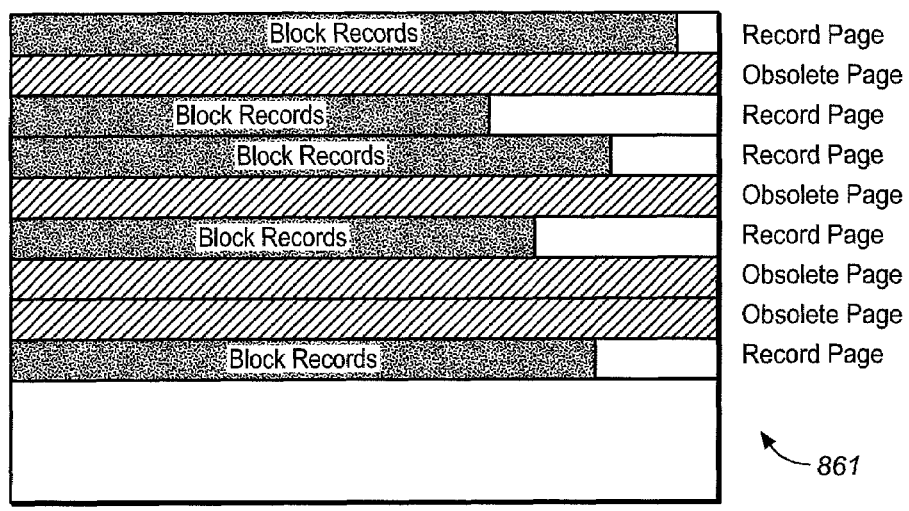
FIG. 8 shows some detail of the page structure of a record block.

Block records are contained in one or more dedicated record blocks such as record block 861 shown in FIG. 8. Unlike the first example, block lists and block records are not stored together in the same block. Only one block record block may contain un-programmed pages into which block records may be written. All block record information is programmed at the next un-programmed page location in this block, which is identified by a block record write pointer. When the last page in the block has been programmed, the block record write pointer is moved to the first page of an erased block. Block record blocks may contain obsolete pages resulting from block record pages having been rewritten. In some embodiments, valid block record pages do not contain obsolete records as a block records page is rewritten whenever a record in the page becomes obsolete. In other embodiments, obsolete records may remain in valid block record pages. However, the directory entries for obsolete records are deleted or replaced with entries pointing to valid records so that obsolete records are not accessed. Obsolete records in a record page are not copied when the record page is rewritten.

Figure 9:
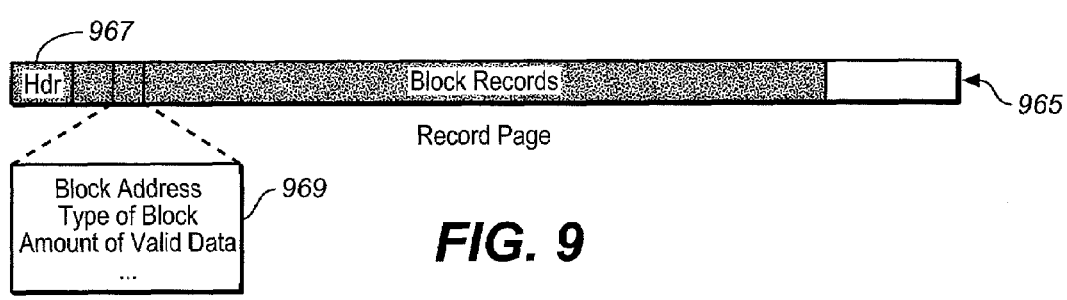
FIG. 9 shows the structure of a record page of FIG. 8 in more detail.

A block record page contains a set of block records that are referenced by block directory entries within a single block directory page, in the same order as the entries in the block directory page. FIG. 9 shows an example of a block record page 965. A block directory page may reference multiple block record pages. Modification of a block record page may be made with consequent need for modification of only a single block directory page. Unlike the first example, a block record page according to the present example does not include a block record index because block record pages are directly identified by the block directory entries.

A block record page may be modified by reading the page, then updating or adding one or more block records. Any obsolete block records are removed by compacting the page, and the page is programmed at location identified by the block record write pointer.

A block record page header stores a reference to the block directory page with which a block record page is associated, and the length of block record information within the block record page. The block record page header also stores a record of the number of obsolete pages existing in each of the block record blocks at the time the block record page was written. This information is only valid in the most recently written block record page header.

An individual block record entry is of variable size. Thus, the record for a complete common block may be larger than the record for an erased block. Unlike the first example, no separate common block records area is needed. A record block of the present example has fields defining attribute of a block as follows:

(1) Block address.
(2) Type of block, PB, OB, CCB, or EB.
(3) The capacity of valid data in the block.
(4) The position of the page write pointer in the block.
(5) Total number of files for which data exists in block.
(6) The fileIDs for each file for which data exists in block.

In other examples, records may contain different fields including different descriptor values.

Reclaim Process for Block Records in Second Example

Block records are contained in one or more record blocks and are directly addressed by block directory entries. Only one record block contains erased pages that are available for programming new or updated block records. In all other record blocks, all pages have been programmed, but the block may contain fully obsolete or partially obsolete pages. Reclaim of the capacity occupied by obsolete block records is performed by designating one record block as the next block to be reclaimed, and progressively copying pages from this reclaim block to the page currently designated by the block record write pointer, before erasing the reclaim block.

A reclaim block is selected when a previous reclaim process on a record block has been completed and the previous reclaim block has been erased. The record block with the highest number of obsolete pages is selected as the reclaim block. The number of obsolete pages for each record block is recorded in the block record page header of the most recently written block record page. The record block containing the block record write pointer may not be selected for reclaim. The selected record block remains as the reclaim block until the reclaim process has been completed and the block has been erased. The erased block is then added to the erased block pool and may be used again to store data of any kind including host data. Thus, a block remains a dedicated record block for a time but is not permanently designated as a record block.

The process of reclaiming block record blocks containing obsolete pages entails copying a small number of pages containing valid block records from the block to the page designated by the block record write pointer, in bursts at scheduled intervals. The number of pages in a burst should be the number of pages contained in a metapage for good performance. However, in some cases fewer pages may be written at a time. Programming the pages at the block record write pointer may be performed as a single programming operation on a metapage. A burst copy operation of pages in the reclaim block may be scheduled at intervals defined by progression of the block record write pointer through the number of page positions contained in 4 metapages. To program a metapage, the write pointer generally must point to the first page in a physical metapage when a burst copy operation is scheduled.

In contrast to the reclaim process for block record blocks described above, a reclaim process for directory blocks is simply a matter of compacting a block directory block when no erased space remains in the directory block. Where a block directory block has a maximum of 25% valid pages at any time (logical capacity is 25% of physical capacity in this example), compaction of such a block results in a block having at least 75% erased space. When compaction occurs, the block from which data is copied becomes an invalid block and is erased to become an erased block. The block is then added to the erased block pool and may be used to store any kind of data including host data. Thus, a block remains a dedicated directory block for a time but is not permanently designated as a directory block.

Updating Structures of Second Example

Figure 10:
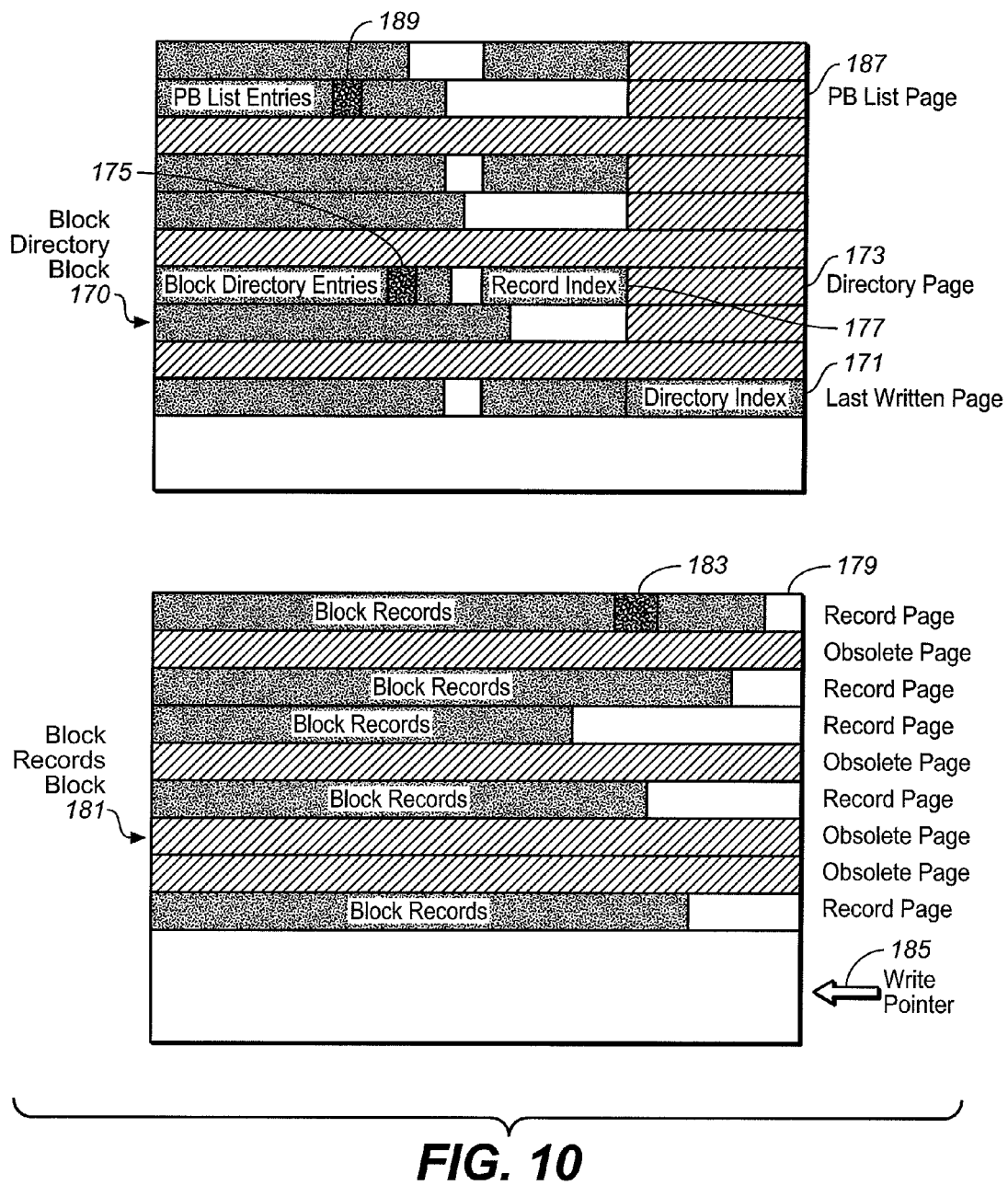
FIG. 10 shows a directory block and record block undergoing an update of block records and related structures.

When data is written to a block in the memory array or when a file is deleted, one or more block records may need to be updated. In addition, the corresponding block directory and list entries may need to be updated. The following process, as shown in FIG. 10, illustrates updating various structures of the second example when additional valid data is stored in a partial block (already containing some obsolete data) causing the block to become an obsolete block.

(1) Receive address of block that is to store additional data.
(2) Look at directory index 171 in last written page of the block directory block 170 to determine physical page location of directory page 173 containing the directory entry 175 for this block.
(3) Perform binary search within directory page 173 to find entry 175 for the block.
(4) Determine from logical identifier in entry 175, along with information in record index 177, the physical page 179 in block records block 181 that contains the record 183 for this block. Use offset in directory entry 175 to find the correct record 183 corresponding to the received address.
(5) Determine the classification of the block from record 183. Determine whether storage of additional data causes classification to change. Here, the block is a partial block and the additional data fills the remaining space in the block so that it becomes an obsolete block.
(6) Copy the contents of record page 183 to the location indicated by write pointer 185, with record 183 for the present block updated to reflect different type of block, valid data, position of page write pointer etc.
(7) Copy directory page 173 to the next available physical page in block directory block 170. Write new directory page with updated entry and record index to reflect new physical location of record page. Also, update directory index in the new physical page.
(8) Look at directory index again to determine the physical page location of a partial block list page 187 containing an entry 189 for the block. (In some other cases may look at more than one list).

(9) Perform binary search in page 187 to find list entry 189 with a descriptor value equal to that of the present block. If more than one list entry has the descriptor value, then search all matching entries by block address.

(10) Copy partial block list page 187 to new location with entry 189 for the present block deleted. New partial block page includes updated directory index with new physical location for partial block page.

(11) Look at directory index again to determine the physical page location of an obsolete block list page that covers the valid data per block range which includes the amount of valid data in the present block (not shown).

(12) Copy the obsolete block list page, adding a new entry for the present block at the appropriate offset, according to the amount of valid data now in the block. The new obsolete block list page includes updated directory index indicating new location for obsolete block list (not shown).

The above steps are not necessarily carried out in the order shown. Some steps may be carried out in parallel. For example, writing of an updated obsolete block list page and an updated partial block list page may be in parallel as part of a metablock write.

DETAILED THIRD EXAMPLE

In a third example, a record is maintained for each block in the memory array at all times. This may involve one or more additional classifications of blocks, for example, an additional classification for file blocks that do not contain obsolete data may be added to the classifications of the second example shown in FIG. 4. Although maintaining a record for each block adds to the total number of records that are maintained, it may allow simpler structures to be used. The third example may operate similarly to the second example apart from having a record for each block.

For example, where records are maintained for every block, directory entries are also maintained for every block. Directory entries have a fixed, uniform size. So, a directory page may contain a fixed number of entries that are sequentially ordered by block address. Thus, each directory page covers a fixed block address range. Because entries within such a page are at predetermined offsets according to their block address, it is unnecessary to separately record a block address in each entry. Finding a directory entry for a particular block may be a matter of finding the directory page that covers the block address range that includes the block, and then going to the entry within that page at an offset given by the difference between the block address of the first entry of the directory page and the desired block address. Thus, no binary search of a directory page may be needed. In contrast, records are generally variable in size, so a record page does not always maintain a fixed number of entries. Unlike previous examples, in the present example records may be maintained for blocks for which no entry exists in any list.

Maintaining a record for each block in the memory is convenient for some applications. For example, descriptors may be maintained regarding physical characteristics of a block. One example of such a descriptor is an erase count. An erase count indicates the number of times a particular block has been erased and may be used for wear leveling purposes. One or more lists may order blocks according to their erase count. Alternatively, a record may include a time stamp from the last time a block was erased so that blocks may be ordered in a list by time since their last erase.

Although the various aspects of the present invention have been described with respect to exemplary embodiments thereof, it will be understood that the present invention is entitled to protection within the full scope of the appended claims.

The invention claimed is:

1. A non-volatile re-programmable memory system, comprising:
    an array of memory cells grouped into blocks of memory cells that are erased together prior to reprogramming data into pages of the blocks, the blocks being identified by physical block addresses,
    a controller operably connected with the array of memory cells and which operates in a manner comprising:
        receives data from outside the memory system and store the received data into one or more of the blocks,
        maintains a plurality of records for the plurality of blocks, the records individually including values of a plurality of descriptors of different aspects of the data stored in one of the plurality of blocks to which the record pertains as identified by the address of the block, wherein the controller operates to write values of a first descriptor in the records that are amounts of valid data in the corresponding blocks, and additionally operates to write values of a second descriptor in the records that are amounts of erased capacity in the corresponding blocks,
        maintains a first list that includes pointers by the addresses of the plurality of blocks, the pointers individually pointing to the location within the array of memory cells of one of the records for one of the blocks in response to receiving the address of said one block, and further wherein the pointers are placed in the list of pointers in order of the addresses of their respective plurality of blocks,
        maintains a second list that includes addresses of the plurality of blocks whose corresponding records contain values of at least first and second descriptors, wherein the addresses of the plurality of blocks in the second list are placed in an order of values of the first descriptor in their corresponding records,
        maintains a third list that includes addresses of the plurality of blocks whose corresponding records contain at least values of descriptors of at least an amount of valid data in the corresponding blocks and an amount of obsolete data in the corresponding blocks, wherein the controller further operates to place addresses of the plurality of blocks in the third list in an order of values of the amount of valid data in the corresponding blocks, and
        causes an operation to be performed on data stored in individual ones of the plurality of blocks in the second list in the order in which they appear in the second list.

2. The memory system of claim 1, wherein the controller operation on individual ones of the plurality of blocks comprises copying valid data from the individual block into another block with erased space and thereafter erasing the individual block.

3. The memory system of claim 1, wherein the controller additionally omits blocks from the third list that have corresponding records which contain values of the second descriptor.

4. A non-volatile re-programmable memory system, comprising:
    an array of memory cells grouped into blocks of memory cells that are erased together prior to reprogramming data into pages of the blocks, the blocks being identified by physical block addresses, a controller operably connected with the array of memory cells and which operates in a manner comprising:

stores data received by the memory system in a plurality of the blocks, maintains a plurality of records for the plurality of blocks, the records individually including an indication of an amount of valid data, an amount of obsolete data and an amount of erased capacity within an individual one of the plurality of blocks to which the record pertains as identified by the address of the block, maintains a first list that includes pointers by the addresses of the plurality of blocks, the pointers individually pointing to the location within the memory system of one of the records for one of the blocks in response to receiving the address of said one block, and further wherein the pointers are placed in the list of pointers in order of the addresses of their respective plurality of blocks, maintains a second list of addresses of the plurality of blocks whose corresponding records contain positive values of at least valid data and erased capacity, wherein the addresses of the plurality of blocks in the second list are placed in an order of amounts of valid data in their corresponding records, maintains a third list of addresses of the plurality of blocks whose corresponding records contain positive values of at least valid data and obsolete data but no amount of erased capacity, wherein the addresses of the plurality of blocks in the third list are placed in an order of amounts of valid data in their corresponding records, and causes the blocks whose addresses are on the second and third lists to be accessed for performing an operation of the memory system on data stored in individual ones of the plurality of blocks in the order in which they appear in the second and third lists.

* * * * *